Feb. 24, 1942.     R. MEREDITH     2,274,631
WELDING TORCH
Filed Jan. 4, 1941     2 Sheets-Sheet 1
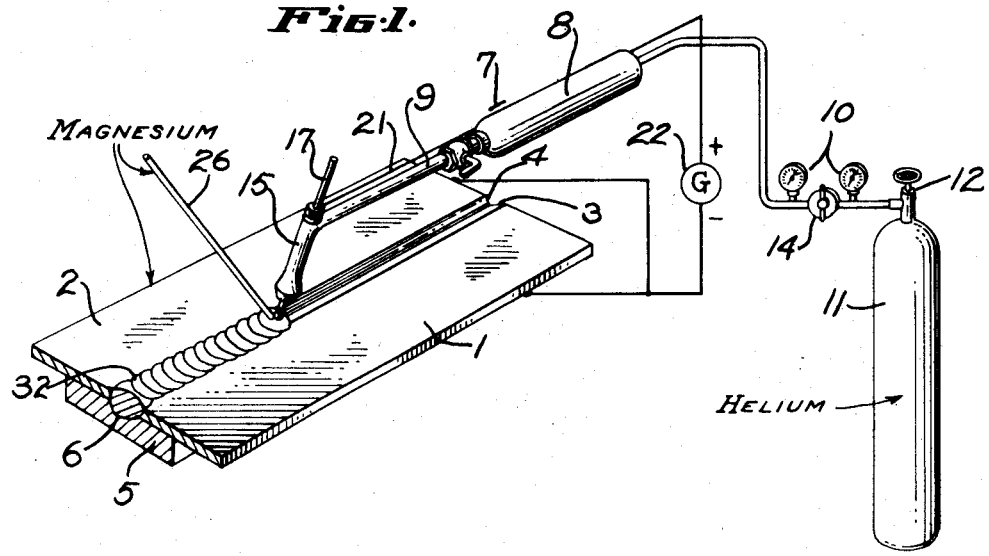
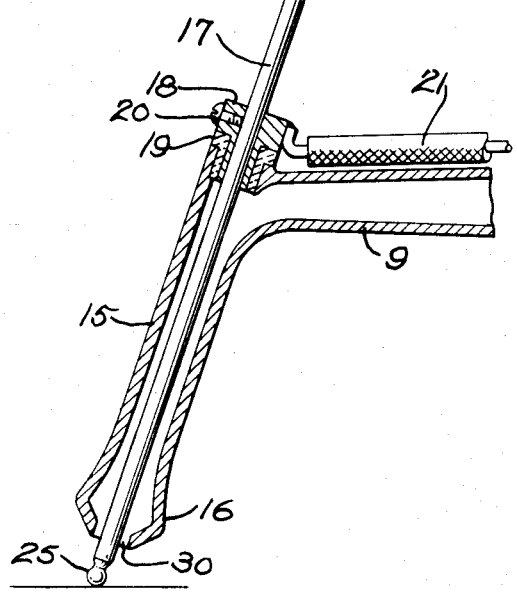
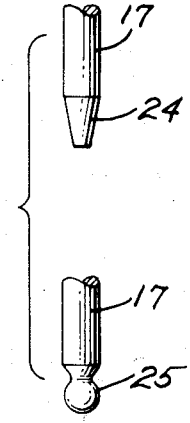
INVENTOR.
RUSSELL MEREDITH
BY
Lippincott + Metcalf
ATTORNEY.

Feb. 24, 1942.   R. MEREDITH   2,274,631
WELDING TORCH
Filed Jan. 4, 1941   2 Sheets-Sheet 2

INVENTOR.
RUSSELL MEREDITH
BY
Lippincott & Metcalf
ATTORNEY.

Patented Feb. 24, 1942

2,274,631

UNITED STATES PATENT OFFICE 2,274,631

WELDING TORCH

Russell Meredith, Los Angeles, Calif., assignor to Northrop Aircraft, Inc., Hawthorne, Calif., a corporation of California Application January 4, 1941, Serial No. 373,157

4 Claims. (Cl. 219—15)

My invention relates to welding of magnesium and its alloys, and more particularly to a means whereby inflammable metals having a relatively low melting point may be efficiently welded by the electric arc.

In modern airplane development, the trend is toward the use of light, strong alloys, and as a consequence magnesium, due to its lightness, is more and more coming into use for such purposes. In most cases when magnesium sheets, or sheets made of magnesium alloys containing a predominance of magnesium are used and the airplane or other light structures fabricated from these sheets, and from extruded elements of the same material, the structures have generally heretofore been fabricated by riveting. Obviously, a welding technique capable of welding highly inflammable materials, such as magnesium, must differ greatly from the techniques used in welding materials having high melting points and higher ignition temperatures. It is well known that magnesium metal will burn in practically all of the polytomic gases, such as for example, oxygen, carbon dioxide and nitrogen.

I have found however, that when magnesium is blanketed with a covering of a monatomic inert gas, such as helium, that ignition of the magnesium will not occur. I have also found that magnesium and various alloys thereof, such as for example, the various grades of "Dowmetal" rapidly lose their stiffness upon being heated at relatively low temperatures, and the scarfed edges become limp and sag to such an extent that ordinary welding methods are entirely unsatisfactory.

The primary object of my invention is to provide a means for welding magnesium without ignition thereof. Another object of my invention is the providing of a means for welding magnesium and its common alloys, in such a manner that a strong weld is made and wherein sagging and deformation of the metal adjacent the weld is controlled, without the application of corrosive welding fluxes commonly used for welding of light alloys generally and magnesium alloys in particular. I have also found that in the welding of magnesium the cast structure of the weld has approximately 50% of the strength of the original wrought metal, in pounds per square inch, and in consequence another object of my invention is to provide a means and method of making a magnesium weld wherein the weld section is increased approximately 100% in area so that the weld portion is approximately as strong as the adjacent material.

Broadly as to method, my invention comprises the striking of an electric arc between a tungsten rod and the magnesium pieces to be welded, in an atmosphere of helium which is being supplied to the arc region under relatively low pressure. During the welding of magnesium pieces, I prefer to form the weld under the influence of gravity and prevent sagging, running and dripping by backing the weld in such a manner that the lower part of the weld is molded with an enlarged weld section, so that after the weld is completed, the weld area will have a larger section than that of the adjacent material. In some cases I may form the backing of magnesium itself, or I may back the pieces to be welded by a material having a higher melting point than the magnesium, so that the melted magnesium will not stick thereto, and so that the finished weld can be easily removed from the backing.

My invention may be more fully understood by direct reference to the drawings, wherein:

Fig. 1 is a partly diagrammatic perspective view of the general welding layout embodying my invention.

Fig. 2 is a view partly in section of the helium tungsten welding "torch" as it may be called, shown diagrammatically in Fig. 1.

Fig. 3 shows two views of the tungsten rod tip.

Figure 4:
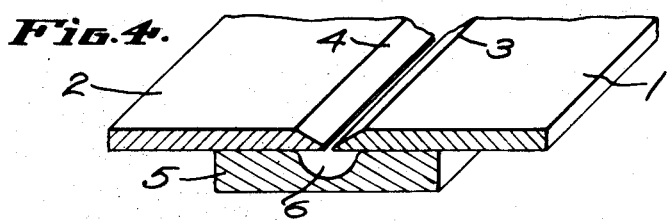
Figs. 4 and 5 and 6 are sectional and perspective views of different stages of a butt-weld made on magnesium sheet.

Referring directly to Fig. 1 for the general setup of my invention for a butt-weld, a pair of magnesium sheets 1 and 2 are held securely in a jig, not shown, and the edges of the sheets to be welded are provided with scarfs 3 and 4, the angle formed by these scarfs being on the order of 100°, this angle being varied somewhat in accordance with the thickness and specific chemical structure of the magnesium or alloy to be welded. The sharp lower edges of the scarfs 3 and 4 are closely adjacent, and the sheets 1 and 2 are preferably positioned in a horizontal plane so that gravity may act on the metal during the weld. Immediately beneath the scarfed edges 3 and 4 of the sheet is positioned a backing plate 5 usually of copper having a central semi-elliptical channel 6 therein, centered with respect to the alined edges of the scarfs. The backing plate 5 may well be an integral portion of the jig holding sheets 1 and 2. If desired, and for best results the chilling effect of the backing plates on the weld can be reduced by suitable heat transfer means, preferably electric, embedded in the backing plate 6. The welding torch 7 is provided comprising a handle 8 surrounding a copper tube 9 extending therethrough, one end of which connects to a pressure gauge system 10 of the usual type which is supplied with gas from a helium tank 11 controlled by a shut-off valve 12. Helium tank 11 contains relatively pure helium under pressure, and the pressure is reduced by reducing valve 14 to a value in the neighborhood of about one-third pound per square inch pressure. The other end of pipe 9 connects with a hollow delivery nozzle 15 terminating in a flare 16. A tungsten welding rod 17 passes axially through nozzle 15, and is held in place by a copper bushing 18 attached to a heat resisting insulator 19, which is pressed into the top of nozzle 15. Rod 17 is adjustable in nozzle 15 by the use of rod set-screw 20. Copper bushing 18 is supplied with electrical current through one or more parallel connected supply wires 21, these wires passing through handle 8 and going to a direct current generator 22, the other pole of which is connected to sheets 1 and 2 and backing 6, by appropriate connectors. This connection may of course be made to the jig, but I have found it preferable to connect the generator directly to both sheets for best results.

The arc tip of rod 17 is shown in Fig. 3, this tip being originally ground to a coned end 24 before being used, and I have found that after the arc has been struck this coned end changes shape due to the heat of the arc, to a ball-end 25, and that this ball-end once formed, remains in good condition for a large amount of welding. After the ball-end 25 has been destroyed by repeated welds, the rod may be reconed by hand and re-formed into a ball by welding. The metal for the weld is supplied by a magnesium alloy filler rod 26 without flux coating of any kind, and best results have been obtained by feeding this rod in on the side of the scarf as shown in Fig. 1.

Figure 5:
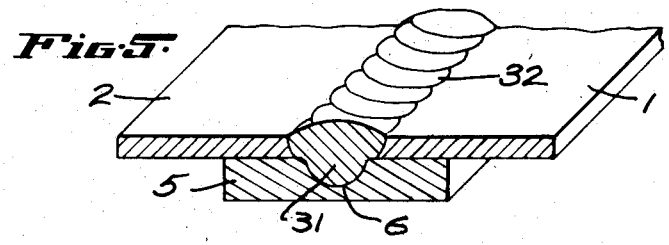
Figure 6:
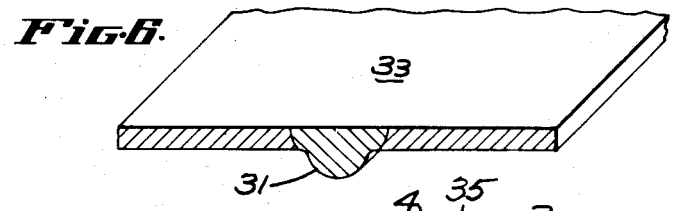

Various stages in the formation of a butt-weld are shown in Figs. 4, 5 and 6. For magnesium sheets from .040 to .1 inch, an open circuit generator voltage of from 40 to 60 volts may be used with amperage varying from 35 to 75 amperes in accordance with the demand required. Helium is then flowed at low pressure, say about one-third pound per square inch in the nozzle, through the pipe-line 9, so that it emerges from the open end 30 on nozzle 15, immediately around the tip 25 of tungsten rod 17.

The arc is then struck against the object to be welded, and the magnesium alloy filler rod is fed into the arc rather than into the scarf. The arc should be moved to the bottom of the scarf, then to the top of the bead, as the metal from the filler rod is melted in the arc, so as to insure full fusion of the metal, and the arc should be maintained close to the puddle formed by the metal melting from the filler rod 26 and the melted sheet edges. The cold filler rod should never touch the molten metal and should not be used to form the puddle as this will cause a gas inclusion. The filler rod is merely used for feeding metal into the arc as needed. The puddle should be formed by movement of the tungsten tip 25, with the weld metal being flowed in from the side from the filler rod. Under these conditions tungsten does not deposit in the weld, but changes to tungsten oxide, and either disappears as a gas or deposits on the sheets 1 and 2 at a distance from the weld.

With this in mind, and with the sheets 1 and 2 set up as shown in Fig. 1 and Fig. 4, the weld is started. The helium gas surrounding the arc prevents ignition of the sheet edges or of the filler rod and a puddle forms. Backing plate 6 controls sagging of the sheet edges on the sides of the weld, but allows sagging into channel 6, with channel 6 acting as a mold, so that on the back of the weld semi-elliptical bead 31 is formed as the weld is built up from a series of puddles 32 as shown in Fig. 5. These puddles should be made sufficiently high above the surface of sheets 1 and 2 to allow for shrinkage. After the weld is finished the surface indications of the puddles 32 may be removed by grinding, if desired, to leave a smooth top surface 33 as shown in Fig. 6 backed by bead 31. The weld section, due to the molding of the back of the weld may be made approximately 100% greater than the sheet section, and in consequence the loss of strength in the weld may be approximately compensated for. The use of the backing strip as a whole prevents any dripping, running or distortion other than the desired and controlled shaping of the weld and adjacent areas.

Figure 7:
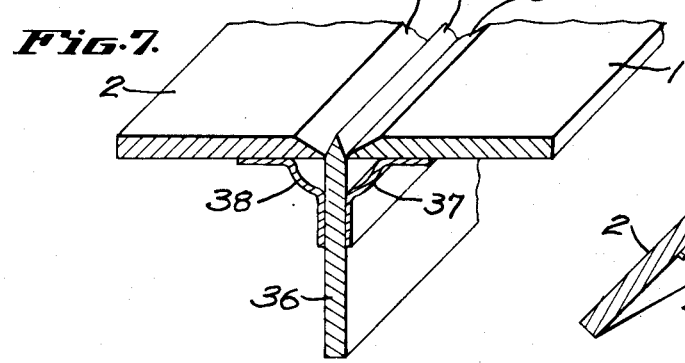
Figs. 7 and 8 are similar figures of a T-weld.
Figure 8:
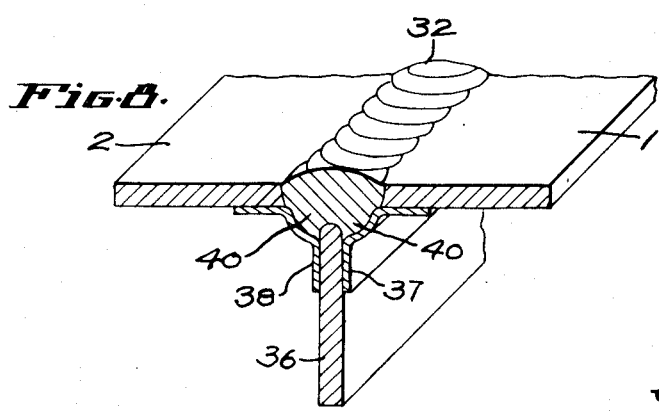

In Figs. 7 and 8 I have shown a T-weld where sheets 1 and 2 are provided with their scarfs 3 and 4 separated by a scarfed edge 35 of a third sheet 36. Thus I provide a double channel weld which is then made as directed for the butt-welds. In this case backing plates 37 and 38 are positioned in the angles beneath scarfs 3 and 4 so that a quarter round bead 40 may be formed joining plate 36 with sheets 1 and 2. The puddles 32 form the top of the T-weld in this case, and if puddles 32 are on the outside surfaces of the plane, these may later be removed to form a smooth top surface which is highly desirable in airplane construction.

Figure 9:
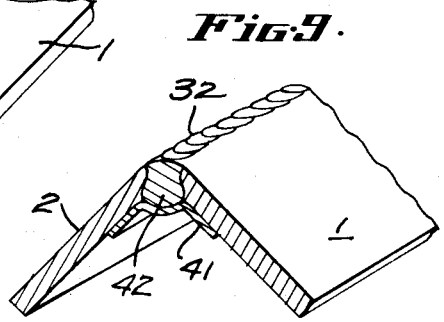
Fig. 9 is a similar view of an angle weld.

In Fig. 9 I have shown an angle weld which is made similarly to a butt-weld, except that an angular backing plate 41 is used so that a segmental bead 42 may be formed on the inner angle of the joined plates, with the puddles 32 on the outside of the angle.

It will be obvious to those skilled in the art that other shapes may be welded as desired, utilizing the teachings outlined above by using scarfed edges, a backing member having a channel therein, so that the sagging material may be accurately molded as desired to form a strengthening bead. It is also obvious that welds can be made with flat backing plates if high strength is not necessary, or without backing plates of any nature, if sagging of the welded edges or the weld is not objectionable.

Figure 10:
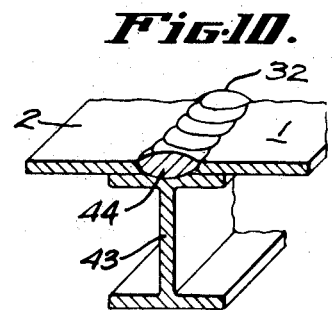
Fig. 10 is a similar view of a weld made between sheet on an extruded part.

It will also be obvious to those skilled in the art, that when welds are to be made to extruded members, such as a butt-weld between sheets to the top of an extended I-beam 43 or similar section, that the I-beam may be positioned beneath the scarfed edges of the sheet and that in this case no channel is needed, as the weld can be carried down into the I-beam material as shown in Fig. 10. Under these circumstances, weld 44 will then attach all three pieces.

I would like to point out several features of my invention which, while not essential to the broad practice of the invention, are highly desirable in making perfect welds. It will be noticed that I have used a flared portion 16 at the end of the welding torch. This flared section is for a definite purpose as it prevents oxygen which is being drawn into the arc region by the action of the outflowing helium gas, from entering the weld and touching the heated metal. The outflowing gas from aperture 30 spreads around the arc with the flow outward over the sheets from the edges of apertures 30. Such an outward helium flow draws air downwardly along nozzle 15, and flare 16 on the nozzle directs this air flow away from the arc region. I have found that such a flare is highly desirable to prevent accidental oxygen entrance into the region of the weld.

I have found that with the use of the method and apparatus described above, that I can make a butt-weld between magnesium sheets of from .040 to .180 inch thickness, for example, at the rate of 10 to 15 inches per minute using 65 to 140 amperes. I have also found that melting of the tungsten rod can be accurately controlled by proportioning the diameter of the rod from approximately .330 of an inch for a 50 ampere current density, up to ¼ inch at a 200 ampere current density. By the use of helium gas surrounding the weld I have completely prevented any ignition or burning of the sheets, filler rod or deposited material, and the weld is free from gas intrusions, and from magnesium or tungsten oxide inclusions. The welding of highly inflammable magnesium is thus as satisfactory from a practical standpoint as the welding of other materials which do not have the low sagging, low ignition and low melting temperatures of magnesium.

An application directed to the method has been filed on October 6, 1941, bearing the serial number of 413,711.

I claim:

1. An open arc welding torch consisting of a hollow handle, a hollow nozzle angularly attached to said handle with the interior of said nozzle connected with the interior of said handle, and open at one end thereof, a conducting fitting insulated from said nozzle and closing the other end thereof, a refractory welding electrode slidable in said fitting and maintained thereby in axial relation to the interior wall of said nozzle with an annular space therebetween, with the end of said electrode projecting outside of said opening, an electrical conductor attached to said fitting, and a source of inert gas connected with the interior of said handle, the wall of said nozzle gradually flaring outward as said opening is approached, and then recurving axially to terminate at said opening to provide an enlarged portion of said annular space adjacent said opening.

2. In an arc welding torch having a single refractory electrode applied to a work piece to form an arc therebetween, a hollow nozzle surrounding said electrode, means for concentrically holding said electrode in said nozzle with the end of said electrode projecting from an opening of said nozzle, the interior of said nozzle being shaped to provide an annular space around said rod within said nozzle, and further being shaped to provide an expanded portion of said interior adjacent said opening, the walls of said nozzle adjacent said opening being of substantially uniform thickness to provide an outer end flare for said nozzle and a conduit for supplying an inert gas to said annular space under pressure to flow through said expanded portion and out of said opening around said end.

3. Apparatus in accordance with claim 2 wherein means are provided to supply said conduit with said inert gas at a pressure on the order of one-third pound per square inch.

4. An open arc welding torch consisting of a hollow handle, a hollow nozzle angularly attached to said handle with the interior of said nozzle connected with the interior of said handle, and open at one end thereof, a conducting fitting insulated from said nozzle and closing the other end thereof, a refractory welding electrode slidable in said fitting and maintained thereby in axial relation to the interior wall of said nozzle with an annular space therebetween, with the end of said electrode projecting outside of said opening, an electrical conductor attached to said fitting, and a source of inert gas connected with the interior of said handle, the wall of said nozzle gradually flaring outwardly as said opening is approached, and then recurving axially to terminate at said opening, said wall being of substantially uniform thickness to provide an outer flare and an inner expanded portion of said annular space just inside said opening to provide an enlarged portion of said annular space adjacent said opening.

RUSSELL MEREDITH.